(12) United States Patent
Mishima et al.

(10) Patent No.: US 11,498,366 B2
(45) Date of Patent: Nov. 15, 2022

(54) TIRE

(71) Applicant: Sumitomo Rubber Industries, Ltd., Hyogo (JP)

(72) Inventors: Mari Mishima, Kobe (JP); Hiroshi Yamaoka, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 287 days.

(21) Appl. No.: 16/851,923

(22) Filed: Apr. 17, 2020

(65) Prior Publication Data
US 2020/0376894 A1  Dec. 3, 2020

(30) Foreign Application Priority Data

May 31, 2019 (JP) ............................. JP2019-102095

(51) Int. Cl.
*B60C 11/03* (2006.01)
*B60C 11/12* (2006.01)
*B60C 11/01* (2006.01)

(52) U.S. Cl.
CPC .......... *B60C 11/01* (2013.01); *B60C 11/0304* (2013.01); *B60C 11/0323* (2013.01);
(Continued)

(58) Field of Classification Search
CPC ............. B60C 11/1281; B60C 11/0323; B60C 11/1236; B60C 11/1259; B60C 11/1204; B60C 2011/013; B60C 11/0304
See application file for complete search history.

(56) References Cited

U.S. PATENT DOCUMENTS 5,772,806 A    6/1998 Moriya
6,408,910 B1 *  6/2002 Lagnier ............... B60C 11/1218
                                                425/37
(Continued)

FOREIGN PATENT DOCUMENTS

JP    01-101205 A  *  4/1989
JP    H08-104111 A     4/1996
(Continued)

OTHER PUBLICATIONS

Machine translation for Japan 01-101205 (Year: 2022).*
(Continued)

*Primary Examiner* — Steven D Maki
(74) *Attorney, Agent, or Firm* — Studebaker & Brackett PC

(57) ABSTRACT

In a tire having composite grooves provided on a shoulder land portion, dry performance and wet performance are improved. The tire includes a tread portion 2. The tread portion 2 includes a first shoulder land portion 13. The first shoulder land portion 13 has shoulder lateral grooves 15 and shoulder composite grooves 20. The shoulder lateral grooves 15 and the shoulder composite grooves 20 are each curved so as to be convex in a tire circumferential direction. Each shoulder composite groove 20 includes, in a cross section thereof, a sipe element 21 having a width not greater than 1.5 mm and extending from a tread surface of the first shoulder land portion 13 in a tire radial direction, and a groove element 22 connected to an inner side in the tire radial direction of the sipe element 21 and having a width greater than 1.5 mm.

20 Claims, 4 Drawing Sheets

(52) U.S. Cl.
CPC ...... *B60C 11/1204* (2013.01); *B60C 11/1236* (2013.01); *B60C 11/1259* (2013.01); *B60C 11/1281* (2013.01); *B60C 2011/013* (2013.01)

(56) References Cited

U.S. PATENT DOCUMENTS

| | | | | |
|---|---|---|---|---|
| 6,892,775 | B1* | 5/2005 | Himuro | B60C 11/11 152/209.15 |
| 2013/0284335 | A1* | 10/2013 | Rolland | B60C 11/1281 152/209.25 |
| 2014/0311638 | A1* | 10/2014 | Takagi | B60C 11/0304 152/209.8 |
| 2018/0264887 | A1* | 9/2018 | Onitsuka | B60C 11/1236 |
| 2018/0339557 | A1* | 11/2018 | Kimishima | B60C 11/0327 |
| 2019/0351714 | A1* | 11/2019 | Miyazaki | B60C 11/0304 |
| 2020/0376898 | A1* | 12/2020 | Yamaoka | B60C 11/1281 |

FOREIGN PATENT DOCUMENTS

| | | | |
|---|---|---|---|
| JP | 2013-126842 | A * | 6/2013 |
| WO | 2012/058171 | A1 | 5/2012 |
| WO | 2016/061358 | A1 | 4/2016 |
| WO | 2016/156705 | A1 | 10/2016 |
| WO | 2017/074459 | A1 | 5/2017 |

OTHER PUBLICATIONS

Machine translation for Japan 2013-126842 (Year: 2022).*
The extended European search report issued by the European Patent Office on Jul. 21, 2020, which corresponds to European Patent Application No. 20176771.2-1012 and is related to U.S. Appl. No. 16/851,923.

* cited by examiner

TIRE

BACKGROUND OF THE INVENTION

Field of the Invention

The present invention relates to a tire and specifically relates to a tire having composite grooves provided on a shoulder land portion.

Description of the Background Art

Japanese Laid-Open Patent Publication No. H8-104111 discloses a tire having sipes provided on a tread portion. The sipes are each formed as a composite sipe having a widened portion at an end portion in the depth direction of the sipe. In the tire of Japanese Laid-Open Patent Publication No. H8-104111, the composite sipes are expected to maintain wet performance and inhibit uneven wear around the sipes.

As a result of various experiments, the inventors have found that a tire having excellent wet performance can be provided by providing composite grooves and shoulder lateral grooves on a shoulder land portion.

However, in the tire, when great contact pressure acts on the shoulder land portion, strain tends to occur in a tread surface of the shoulder land portion, resulting in deterioration of dry performance. Thus, improvement is required in this regard.

SUMMARY OF THE INVENTION

The present invention has been made in view of the above circumstances, and a main object of the present invention is to improve dry performance and wet performance in a tire having composite grooves provided on a shoulder land portion.

The present invention is directed to a tire including a tread portion, wherein the tread portion includes a first shoulder land portion including a first tread edge, and a first shoulder main groove adjacent to the first shoulder land portion, the first shoulder land portion has a plurality of shoulder lateral grooves and a plurality of shoulder composite grooves extending from the first shoulder main groove to the first tread edge, the plurality of shoulder lateral grooves and the plurality of shoulder composite grooves are each curved so as to be convex in a tire circumferential direction, and each shoulder composite groove includes, in a cross section thereof, a sipe element having a width not greater than 1.5 mm and extending from a tread surface of the first shoulder land portion in a tire radial direction, and a groove element connected to an inner side in the tire radial direction of the sipe element and having a width greater than 1.5 mm.

In the tire according to the present invention, the shoulder lateral grooves and the shoulder composite grooves are preferably curved in the same direction.

In a tread plan view of the tire according to the present invention, a radius of curvature of each shoulder composite groove is preferably larger than a radius of curvature of each shoulder lateral groove.

In the tire according to the present invention, a depth of the sipe element is preferably smaller than a depth of each shoulder lateral groove.

In the tire according to the present invention, preferably, the tread portion includes a first middle land portion adjacent to the first shoulder land portion through the first shoulder main groove, the first middle land portion has a plurality of inclined grooves communicating with the first shoulder main groove, and end portions at the first shoulder main groove side of the inclined grooves face end portions at the first shoulder main groove side of the shoulder lateral grooves in a tire axial direction.

In the tire according to the present invention, preferably, the first shoulder land portion includes a buttress surface outward of the first tread edge in a tire axial direction, and the shoulder composite grooves extend to the buttress surface.

In the tire according to the present invention, preferably, the first shoulder land portion includes recesses formed in the buttress surface, and each recess is connected to the sipe element and the groove element.

In the tire according to the present invention, each recess is preferably recessed in a region surrounded by a trapezoidal edge.

The first shoulder land portion of the tire according to the present invention has a plurality of shoulder lateral grooves and a plurality of shoulder composite grooves extending from the first shoulder main groove to the first tread edge. The plurality of shoulder lateral grooves and the plurality of shoulder composite grooves are each curved so as to be convex in the tire circumferential direction. Accordingly, even when great contact pressure acts on the first shoulder land portion, strain is less likely to occur in the tread surface of the first shoulder land portion, so that excellent dry performance is exhibited.

Each shoulder composite groove includes, in a cross section thereof, a sipe element having a width not greater than 1.5 mm and extending in the tire radial direction, and a groove element connected to an inner side in the tire radial direction of the sipe element and having a width greater than 1.5 mm. The sipe element serves to ensure the area of the tread surface of the first shoulder land portion and improves dry performance. In addition, the groove element improves wet performance in cooperation with the shoulder lateral groove.

DESCRIPTION OF THE PREFERRED EMBODIMENTS

Figure 1:
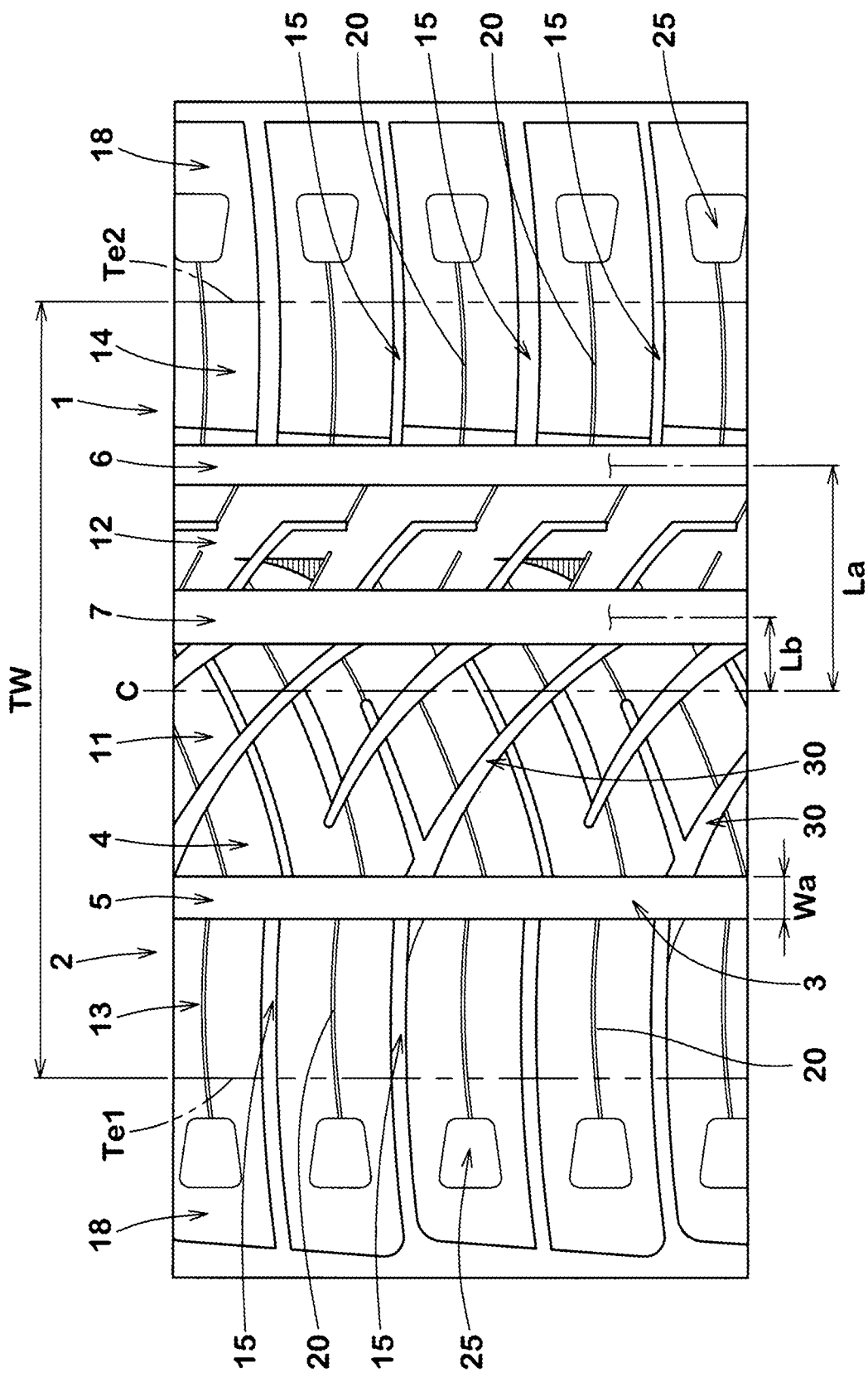
FIG. 1 is a development of a tread portion of a tire according to an embodiment of the present invention.

Hereinafter, an embodiment of the present invention will be described with reference to the drawings. FIG. 1 is a development of a tread portion 2 of a tire 1 showing the embodiment of the present invention. The tire 1 according to the present embodiment is suitably used, for example, as a pneumatic tire for a passenger car. However, the present invention is not limited to such a mode, and may be applied to a heavy-duty pneumatic tire and a non-pneumatic tire the interior of which is not filled with pressurized air.

As shown in FIG. 1, the tire 1 according to the present embodiment has, for example, the tread portion 2 having a designated mounting direction to a vehicle. The tread portion 2 has a first tread edge Te1 located at the outer side of a vehicle when the tire 1 is mounted on the vehicle, and a second tread edge Te2 located at the inner side of the vehicle when the tire 1 is mounted on the vehicle. The mounting direction to a vehicle is indicated, for example, on a sidewall portion (not shown) by characters or a symbol.

In the case of a pneumatic tire, each of the first tread edge Te1 and the second tread edge Te2 is a ground contact position at the outermost side in the tire axial direction when a normal load is applied to the tire 1 in a normal state and the tire 1 is brought into contact with a flat surface at a camber angle of 0°. The normal state is a state where the tire is mounted to a normal rim and inflated to a normal internal pressure and no load is applied to the tire. In the present specification, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 includes three main grooves 3 continuously extending in the tire circumferential direction between the first tread edge Te1 and the second tread edge Te2, and four land portions 4 demarcated by the three main grooves 3.

The main grooves 3 include a first shoulder main groove 5 provided between the first tread edge Te1 and a tire equator C, a second shoulder main groove 6 provided between the second tread edge Te2 and the tire equator C, and a crown main groove 7 provided between the first shoulder main groove 5 and the second shoulder main groove 6.

The distance La in the tire axial direction from the tire equator C to a groove center line of the first shoulder main groove 5 or the second shoulder main groove 6 is, for example, preferably 0.20 to 0.35 times a tread width TW. The distance Lb in the tire axial direction from the tire equator C to a groove center line of the crown main groove 7 is, for example, preferably not greater than 0.15 times the tread width TW. The tread width TW is the distance in the tire axial direction from the first tread edge Te1 to the second tread edge Te2 in the normal state.

The crown main groove 7 of the present embodiment is provided, for example, between the tire equator C and the second tread edge Te2. However, the position of the crown main groove 7 is not limited to such a position.

Each main groove 3 of the present embodiment extends, for example, in a straight manner so as to be parallel to the tire circumferential direction. Each main groove 3 may extend, for example, in a wavy manner.

The groove width Wa of each main groove 3 is at least not less than 3.0 mm and is, for example, preferably 4.0% to 7.0% of the tread width TW. In the present specification, a longitudinal narrow groove having a groove width less than 3.0 mm is distinguished from the main grooves 3. In addition, a groove width is the distance between groove edges in a direction orthogonal to a groove center line. In the case of a pneumatic tire for a passenger car, the depth of each main groove 3 is, for example, preferably 5 to 10 mm.

The land portions 4 include a first middle land portion 11, a second middle land portion 12, a first shoulder land portion 13, and a second shoulder land portion 14. The first middle land portion 11 is demarcated between the first shoulder main groove 5 and the crown main groove 7. The second middle land portion 12 is demarcated between the second shoulder main groove 6 and the crown main groove 7. The first shoulder land portion 13 is demarcated between the first shoulder main groove 5 and the first tread edge Te1. The second shoulder land portion 14 is demarcated between the second shoulder main groove 6 and the second tread edge Te2. In the present embodiment, when the widths in the tire axial direction of the tread surfaces of the respective land portions are compared to each other, the first middle land portion 11 has the largest width among the four land portions. However, the present invention is not limited to such a mode.

Figure 2:
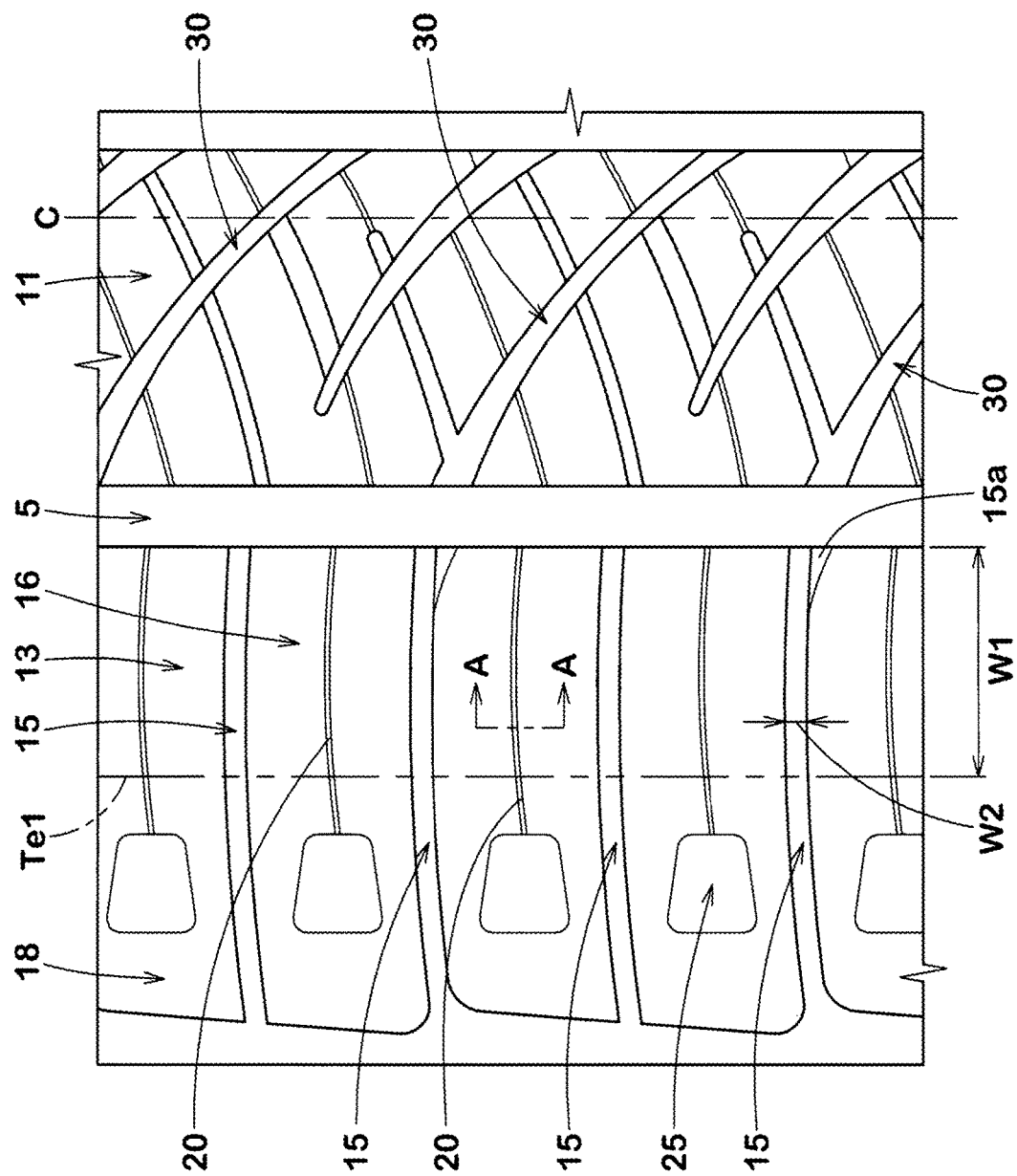
FIG. 2 is an enlarged plan view of a first shoulder land portion and a first middle land portion in FIG. 1.
Figure 3:
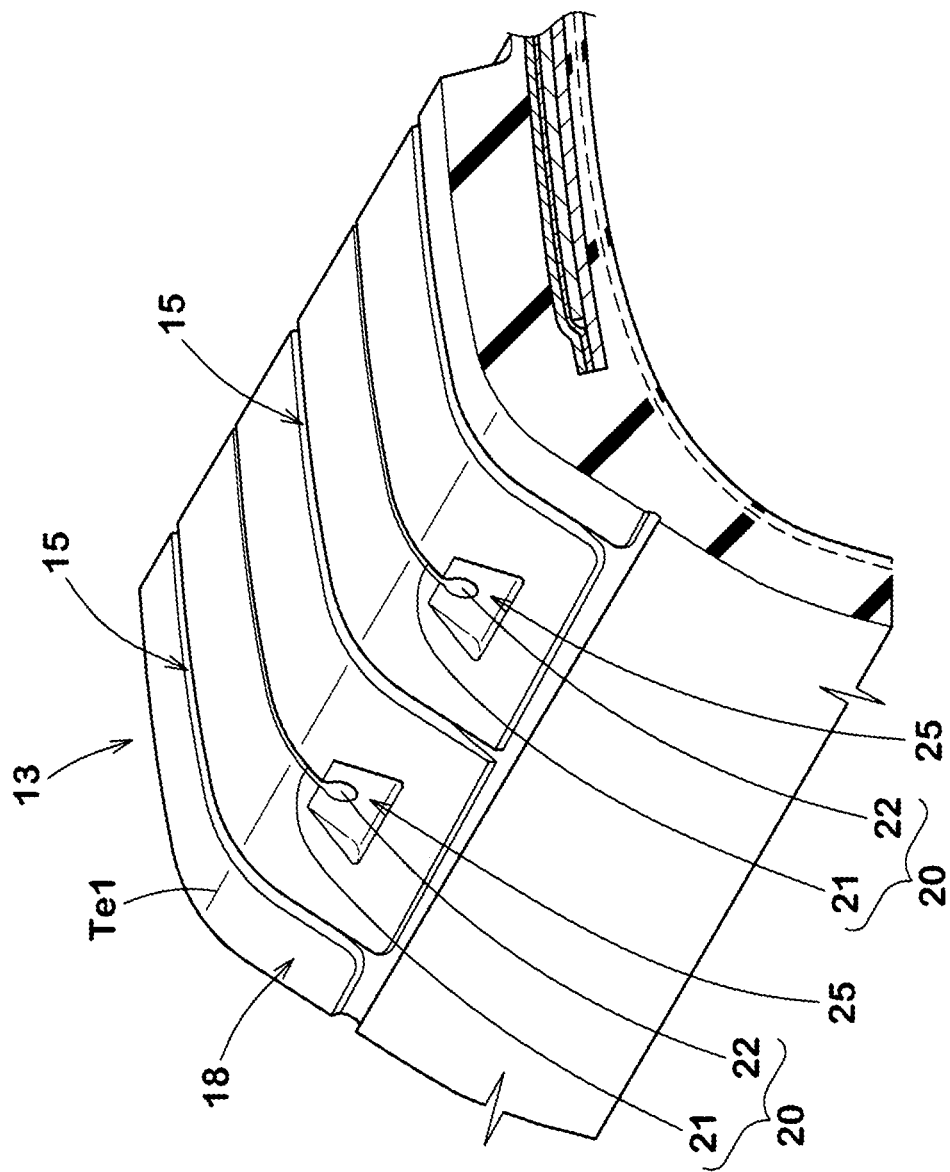
FIG. 3 is an enlarged perspective view of the first shoulder land portion in FIG. 1.

FIG. 2 shows an enlarged plan view of the first shoulder land portion 13 and the first middle land portion 11, and FIG. 3 shows an enlarged perspective view of the first shoulder land portion 13. As shown in FIGS. 2 and 3, the first shoulder land portion 13 includes the first tread edge Te1. In addition, the first shoulder main groove 5 is adjacent to the first shoulder land portion 13. The width W1 in the tire axial direction of the tread surface of the first shoulder land portion 13 is, for example, 0.15 to 0.25 times the tread width TW (shown in FIG. 1). The first shoulder land portion 13 has a plurality of shoulder lateral grooves 15 extending from the first shoulder main groove 5 to the first tread edge Te1.

The groove width W2 of each shoulder lateral groove 15 is, for example, preferably smaller than the groove width Wa (shown in FIG. 1) of each main groove 3. The groove width W2 of each shoulder lateral groove 15 is, for example, 0.30 to 0.60 times the groove width Wa of each main groove 3. The depth of each shoulder lateral groove 15 is, for example, 5 to 10 mm. Such shoulder lateral grooves 15 serve to enhance dry performance and wet performance in a well-balanced manner.

Each shoulder lateral groove 15 is curved so as to be convex at one side in the tire circumferential direction (at the upper side in FIG. 2). The radius of curvature of each shoulder lateral groove 15 is, for example, preferably 270 to 320 mm.

At least one of the shoulder lateral grooves 15 preferably includes, at an end portion at the first shoulder main groove 5 side, a chamfered portion 15a that increases the groove width toward the inner side in the tire axial direction.

The first shoulder land portion 13 has a plurality of shoulder composite grooves 20 extending from the first shoulder main groove 5 to the first tread edge Te1. In the present embodiment, each of shoulder blocks 16 demarcated by the shoulder lateral grooves 15 has one shoulder composite groove 20.

In the present invention, similar to each shoulder lateral groove 15, each shoulder composite groove 20 is also curved so as to be convex in the tire circumferential direction. In a preferable mode, the shoulder lateral grooves 15 and the shoulder composite grooves 20 are curved in the same direction. Accordingly, even when great contact pressure acts on the first shoulder land portion 13, strain is less likely to occur in the tread surface of the first shoulder land portion 13. Thus, for example, even when a large slip angle is provided to the tire, the tread surface of the first shoulder land portion 13 follows a road surface as a whole without causing strain and provides great grip. Therefore, excellent dry performance is exhibited.

Figure 4:
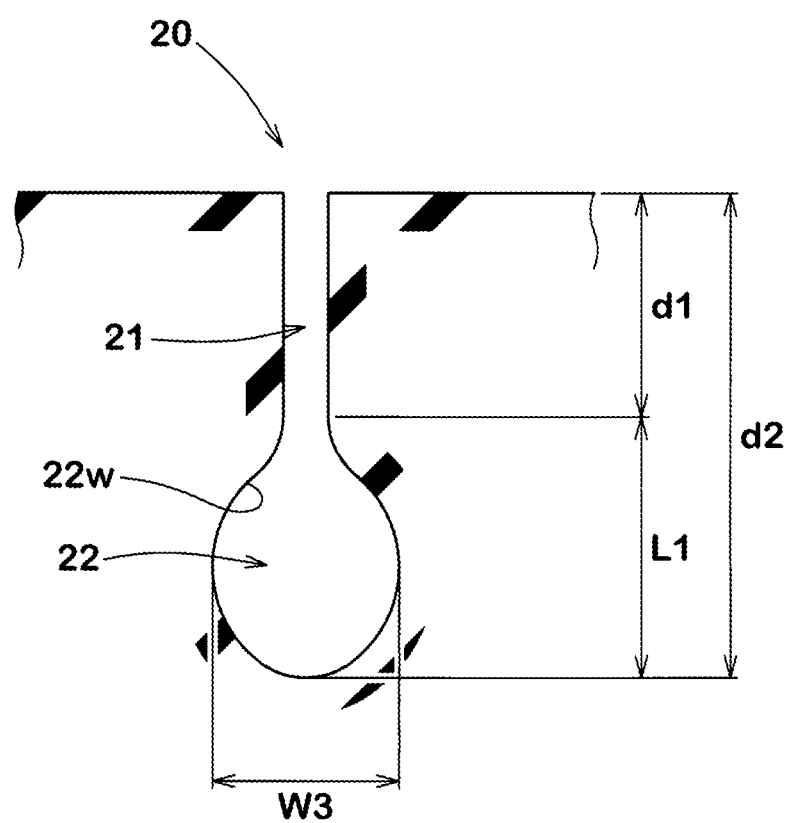
FIG. 4 is a cross-sectional view taken along a line A-A in FIG. 2.

FIG. 4 shows a cross-sectional view of the shoulder composite groove 20 taken along a line A-A in FIG. 2. As shown in FIG. 4, the shoulder composite groove 20 includes, in a cross section thereof, a sipe element 21 having a width not greater than 1.5 mm and extending from the tread surface of the first shoulder land portion 13 in the tire radial direction, and a groove element 22 connected to the inner side in the tire radial direction of the sipe element 21 and having a width greater than 1.5 mm. The sipe element 21 serves to ensure the area of the tread surface of the first shoulder land portion 13 and improves dry performance. In addition, the groove element 22 improves wet performance in cooperation with the shoulder lateral groove 15.

The sipe element 21 extends, for example, in the tire radial direction with a uniform width. The width of the sipe element 21 is preferably 0.5 to 1.0 mm. The depth d1 of the sipe element 21 is preferably smaller than the depth of each shoulder lateral groove 15. Specifically, the depth d1 of the sipe element 21 is preferably 0.40 to 0.60 times the depth of each shoulder lateral groove 15.

The groove element 22 has, for example, a width that smoothly and gradually increases from an outer end portion in the tire radial direction thereof to a maximum width position thereof and that smoothly and gradually decreases from the maximum width position to the bottom of the shoulder composite groove 20. Accordingly, the groove element 22 includes a smoothly curved inner wall 22$w$. Such an inner wall 22$w$ inhibits damage such as a crack of the first shoulder land portion 13 starting from the groove element 22.

The width W3 of the groove element 22 is, for example, preferably smaller than the groove width W2 (shown in FIG. 2) of each shoulder lateral groove 15. The width W3 of the groove element 22 is, for example, preferably 0.50 to 0.80 times the groove width W2 of each shoulder lateral groove 15. Specifically, the width W3 of the groove element 22 is 2.0 to 3.0 mm. Such a groove element 22 can be expected to exhibit excellent drainage performance while maintaining dry performance.

The length L1 in the tire radial direction of the groove element 22 is, for example, preferably larger than the width W3 of the groove element 22. Accordingly, the groove element 22 of the present embodiment is formed in an elliptical shape that is long in the tire radial direction. The length L1 of the groove element 22 is, for example, preferably 1.10 to 1.50 times the width W3 of the groove element 22.

The depth d2 of each shoulder composite groove 20 is, for example, preferably smaller than the depth of each shoulder lateral groove 15. Specifically, the depth d2 is preferably 0.85 to 0.95 times the depth of each shoulder lateral groove 15. Such a shoulder composite groove 20 serves to enhance dry performance and wet performance in a well-balanced manner.

As shown in FIG. 2, the radius of curvature of each shoulder composite groove 20 is, for example, 270 to 320 mm. The radius of curvature of each shoulder composite groove 20 is preferably larger than the radius of curvature of each shoulder lateral groove 15. The radius of curvature of each shoulder composite groove 20 is preferably 1.03 to 1.10 times the radius of curvature of each shoulder lateral groove 15. Such a shoulder composite groove 20 can further inhibit strain of the tread surface of the first shoulder land portion 13.

As shown in FIG. 3, the first shoulder land portion 13 includes a buttress surface 18 outward of the first tread edge Te1 in the tire axial direction. Each shoulder composite groove 20 preferably extends to the buttress surface 18.

The first shoulder land portion 13 of the present embodiment includes recesses 25 recessed in the buttress surface 18. Each recess 25 is, for example, preferably connected to the sipe element 21 and the groove element 22. Such a recess 25 promotes water within the groove element 22 to be discharged to the outside of the tire during running on a wet road and can enhance wet performance.

Each recess 25 of the present embodiment is, for example, recessed in a region surrounded by a trapezoidal edge. Accordingly, the length in the tire circumferential direction of each recess 25 gradually increases toward the inner side in the tire radial direction. The length in the tire circumferential direction of each recess 25 is preferably larger than the groove width of each shoulder lateral groove 15. Accordingly, the drainage performance of the groove element 22 is further enhanced, and damage of the first shoulder land portion 13 starting from the recess 25 is inhibited.

As shown in FIG. 2, the first middle land portion 11 has a plurality of inclined grooves 30 communicating with the first shoulder main groove 5. End portions at the first shoulder main groove 5 side of the inclined grooves 30 face end portions at the first shoulder main groove 5 side of the shoulder lateral grooves 15 in the tire axial direction. This mode includes a mode in which only a part of a region obtained by extending the end portion of each inclined groove 30 so as to be parallel to the tire axial direction overlaps the end portion of the shoulder lateral groove 15. The arrangement of such inclined grooves 30 can further enhance wet performance.

As shown in FIG. 1, the second shoulder land portion 14 of the present embodiment has shoulder lateral grooves 15 and shoulder composite grooves 20 that are the same as those provided on the first shoulder land portion 13. In a preferable mode, the shoulder lateral grooves 15 and the shoulder composite grooves 20 provided on the second shoulder land portion 14 are curved so as to be convex in a direction opposite to that of the shoulder lateral grooves 15 and the shoulder composite grooves 20 provided on the first shoulder land portion 13. Accordingly, dry performance and wet performance are further improved.

Although the tire according to the embodiment of the present invention has been described in detail above, the present invention is not limited to the above specific embodiment, and various modifications can be made to implement the present invention.

EXAMPLES

Tires with a size of 215/60R16 having the basic pattern in FIG. 1 were produced as test tires. As a comparative example, a tire in which a first shoulder land portion is provided with shoulder lateral grooves and shoulder sipes not including a groove element and these grooves and sipes extend in a straight manner was produced as a test tire. The tire of the comparative example has substantially the same pattern as shown in FIG. 1, except for the above matters. The respective test tires were tested for dry performance and wet performance. The common specifications and the test methods for the respective test tires are as follows.

Mount rim: 16×6.5
Tire internal pressure: 240 kPa
Test vehicle: a front-wheel-drive car having an engine displacement of 2500 cc
Tire mounted position: all wheels <Dry Performance>

Sensory evaluation was made by a driver for performance when the driver drove the above test vehicle on a dry road surface. The results are indicated as scores with the score of the comparative example being regarded as 100. A higher value indicates that the dry performance is better.

<Wet Performance>

Sensory evaluation was made by a driver for performance when the driver drove the above test vehicle on a wet road surface. The results are indicated as scores with the score of the comparative example being regarded as 100. A higher value indicates that the wet performance is better.

The test results are shown in Table 1.

TABLE 1

|  | Comparative Example | Example 1 | Example 2 | Example 3 | Example 4 | Example 5 | Example 6 | Example 7 | Example 8 |
|---|---|---|---|---|---|---|---|---|---|
| Presence/absence of groove element | Absence | Presence | Presence | Presence | Presence | Presence | Presence | Presence | Presence |
| Radius of curvature of shoulder lateral groove (mm) | — | 285 | 270 | 300 | 300 | 285 | 285 | 285 | 285 |
| Radius of curvature of shoulder composite groove (mm) | — | 300 | 285 | 320 | 300 | 300 | 300 | 300 | 300 |
| Depth d2 of shoulder composite groove/depth of shoulder lateral groove | 0.92 | 0.92 | 0.92 | 0.92 | 0.92 | 0.80 | 0.85 | 0.95 | 1.00 |
| Dry performance (score) | 100 | 103 | 102 | 102 | 101 | 104 | 103 | 102 | 101 |
| Wet performance (score) | 100 | 105 | 105 | 105 | 104 | 102 | 102 | 105 | 106 |

As a result of the tests, it was confirmed that the tire of each Example exhibits excellent dry performance and wet performance.

What is claimed is:

1. A tire comprising a tread portion, wherein
the tread portion includes a first shoulder land portion including a first tread edge, a first shoulder main groove adjacent to the first shoulder land portion, a first middle land portion adjacent to the first shoulder main groove through the first shoulder land portion, a second shoulder land portion including a second tread edge, a second shoulder main groove adjacent to the second shoulder land portion, and a second middle land portion adjacent to the second shoulder main groove through the second shoulder land portion, all extending in a tire circumferential direction, wherein the first middle land portion has a greater width in the tire axial direction than the second middle land portion, the first shoulder land portion, and the second shoulder land portion,
the first shoulder land portion has a plurality of shoulder lateral grooves and a plurality of shoulder composite grooves extending from the first shoulder main groove to the first tread edge,
the plurality of shoulder lateral grooves and the plurality of shoulder composite grooves are each curved so as to be convex in the tire circumferential direction, and
each shoulder composite groove includes, in a cross section thereof, a sipe element having a width not greater than 1.5 mm and extending from a tread surface of the first shoulder land portion in a tire radial direction, and a groove element connected to an inner side in the tire radial direction of the sipe element and having a width greater than 1.5 mm.

2. The tire according to claim 1, wherein the shoulder lateral grooves and the shoulder composite grooves are curved in the same direction.

3. The tire according to claim 2, wherein, in a tread plan view, a radius of curvature of each shoulder composite groove is larger than a radius of curvature of each shoulder lateral groove.

4. The tire according to claim 3, wherein a depth of the sipe element is smaller than a depth of each shoulder lateral groove.

5. The tire according to claim 2, wherein a depth of the sipe element is smaller than a depth of each shoulder lateral groove.

6. The tire according to claim 1, wherein, in a tread plan view, a radius of curvature of each shoulder composite groove is larger than a radius of curvature of each shoulder lateral groove.

7. The tire according to claim 6, wherein a depth of the sipe element is smaller than a depth of each shoulder lateral groove.

8. The tire according to claim 6, wherein the radius of curvature of each shoulder composite groove is 1.03 to 1.10 times the radius of curvature of each shoulder lateral groove.

9. The tire according to claim 1, wherein a depth of the sipe element is smaller than a depth of each shoulder lateral groove.

10. The tire according to claim 9, wherein the depth of the sipe element is 0.40 to 0.60 times the depth of each shoulder lateral groove.

11. The tire according to claim 9, wherein a depth of each shoulder composite groove is smaller than the depth of each shoulder lateral groove.

12. The tire according to claim 1, wherein
the first middle land portion has a plurality of inclined grooves communicating with the first shoulder main groove, and
end portions at the first shoulder main groove side of the inclined grooves face end portions at the first shoulder main groove side of the shoulder lateral grooves in a tire axial direction.

13. The tire according to claim 1, wherein
the first shoulder land portion includes a buttress surface outward of the first tread edge in a tire axial direction, and the shoulder composite grooves extend to the buttress surface.

14. The tire according to claim 13, wherein the first shoulder land portion includes recesses formed in the buttress surface, and each recess is connected to the sipe element and the groove element.

15. The tire according to claim 14, wherein each recess is recessed in a region surrounded by a trapezoidal edge.

16. The tire according to claim 1, wherein, a width in the tire axial direction of the tread surface of the first shoulder land portion is 0.15 to 0.25 times a tread width.

17. The tire according to claim 1, wherein a width of the groove element is smaller than a groove width of each shoulder lateral groove.

18. The tire according to claim 1, wherein a length in a tire radial direction of the groove element is larger than a width of the groove element.

19. The tire according to claim 1, wherein the groove element is formed in an elliptical shape that is long in the tire radial direction.

20. A tire comprising a tread portion, wherein the tread portion includes a first shoulder land portion including a first tread edge, and a first shoulder main groove adjacent to the first shoulder land portion, the first shoulder land portion has a plurality of shoulder lateral grooves and a plurality of shoulder composite grooves extending from the first shoulder main groove to the first tread edge, the plurality of shoulder lateral grooves and the plurality of shoulder composite grooves are each curved so as to be convex in a tire circumferential direction, each shoulder composite groove includes, in a cross section thereof, a sipe element having a width not greater than 1.5 mm and extending from a tread surface of the first shoulder land portion in a tire radial direction, and a groove element connected to an inner side in the tire radial direction of the sipe element and having a width greater than 1.5 mm, and in a tread plan view, a radius of curvature of each shoulder composite groove is larger than a radius of curvature of each shoulder lateral groove such that the radius of curvature of each shoulder composite groove is 1.03 to 1.07 times the radius of curvature of each shoulder lateral groove.

* * * * *